United States Patent [19]

Namizuka et al.

[11] Patent Number: 5,687,006
[45] Date of Patent: Nov. 11, 1997

[54] IMAGE REGENERATING APPARATUS HAVING IMPROVED CHARACTER RESOLUTION AND PATTERN GRADATION

[75] Inventors: Yoshiyuki Namizuka, Sagamihara; Kouichi Kamon, Yokohama; Masaaki Ito, Zama; Hiroyuki Kawamoto, Kawasaki; Anki Yoh, Tokyo; Takeharu Tone, Yokohama, all of Japan

[73] Assignee: Ricoh Company Ltd., Tokyo, Japan

[21] Appl. No.: 428,305

[22] Filed: Apr. 26, 1995

[30] Foreign Application Priority Data

Apr. 28, 1994 [JP] Japan .................. 6-092260

[51] Int. Cl.$^6$ ............................................. H04N 1/40
[52] U.S. Cl. .................... 358/462; 358/451; 382/263; 382/264
[58] Field of Search ........................... 358/462, 463, 358/464, 447, 451; 382/263, 264, 291, 292, 298; 395/139; H04N 1/40, 1/409

[56] References Cited

U.S. PATENT DOCUMENTS

| | | | |
|---|---|---|---|
| 5,130,820 | 7/1992 | Hirota | 358/447 |
| 5,166,810 | 11/1992 | Sorimachi et al. | 358/451 |
| 5,189,523 | 2/1993 | Sugiura et al. | 358/462 |
| 5,341,227 | 8/1994 | Kumashiro | 358/462 |
| 5,357,353 | 10/1994 | Hirota | 358/530 |
| 5,410,619 | 4/1995 | Fujisawa et al. | 358/462 |
| 5,459,587 | 10/1995 | Fukushima | 358/462 |
| 5,535,013 | 7/1996 | Murata | 358/462 |

FOREIGN PATENT DOCUMENTS

| | | |
|---|---|---|
| 1-137378 | 5/1989 | Japan . |
| 2-34233 | 2/1990 | Japan . |

*Primary Examiner*—Kim Vu
*Attorney, Agent, or Firm*—Lowe, Price, LeBlanc & Becker

[57] ABSTRACT

In order to realize reduction of product cost without deteriorating quality of a regenerated image, there is provided by the present invention an image regenerating apparatus comprising an emphasizing unit for filtering an image for emphasis, a smoothing unit for filtering image for smoothing, an area determinator for determining a character area and a photograph area of an image, selecting said emphasizing unit for said character area and also selecting said smoothing unit for said photograph area, an image size changing unit for changing size of an image according to a set image size changing ratio, and a controller for providing control so that said area determinator executes specified selection when an image size changing ratio set by said image size changing unit is equal to or larger than a specified magnification ratio.

8 Claims, 9 Drawing Sheets

Auxiliary scanning direction detection edge

Main scanning direction detection edge

FIG.6

5b Area determining section

Auxiliary scanning direction

FIG. 11

| 1/26 | 1/26 | 1/26 | 1/26 | 1/26 |
|------|------|------|------|------|
| 1/26 | 1/26 | 1/26 | 1/26 | 1/26 |
| 1/26 | 1/26 | 2/26 | 1/26 | 1/26 |
| 1/26 | 1/26 | 1/26 | 1/26 | 1/26 |
| 1/26 | 1/26 | 1/26 | 1/26 | 1/26 |

IMAGE REGENERATING APPARATUS HAVING IMPROVED CHARACTER RESOLUTION AND PATTERN GRADATION

FIELD OF THE INVENTION

The present invention relates to an image regenerating apparatus which improves quality of an inputted image with character sections and pictures (pattern sections) coexisting therein by improving the resolution in the character section and also improving the gradation in the pattern section, and especially to an image regenerating apparatus suited to, for instance, a digital copying machine.

BACKGROUND OF THE INVENTION

As this type of apparatus, there has been known an apparatus which extracts a screen dot area as a photograph when separating a character area from a photograph area such as that disclosed in Japanese Patent Laid Open Publication No. 34233/1990, or an apparatus which separates a character image from a photograph image by extracting features thereof respectively and subjecting the character image and photograph image to filtering separately and switching a binary value coding unit, as disclosed in Japanese Patent Laid Open Publication No. 137378/1989.

In the conventional type of area separating method, however, a determination area is not so wide, so that an error may be generated in a signal enlarged in the auxiliary scanning direction when an image is enlarged, scratch noise becomes remarkable in the regenerated image because of the error described above, and quality of an image is deteriorated when the magnification ratio is higher than a specified value.

SUMMARY OF THE INVENTION

It is an object of the present invention to realize reduction of a production cost without deteriorating quality of a regenerated image.

In an image regenerating apparatus according to the present invention, when a size changing ratio by an image size changing unit is equal to or larger than a specified magnification ratio, control is provided so that an area determinator executes specified selection. Moire of a pattern area is not generated when an image is enlarged in regeneration, the determination area is small, and when a character area or a non-character area is determined incorrectly, quality of an inputted image with character sections and pattern sections coexisting therein can be improved by improving the resolution in the character sections and also improving the gradation in the pattern sections.

In an image regenerating apparatus according to the present invention, when a size changing ratio by a size changing unit is equal to or larger than a specified magnification ratio, control is provided so that a filtering coefficient for an emphasizing unit is equalized to that for a smoothing unit. Moire of a pattern area is not generated when an image is enlarged in regeneration, the determination area is small, and when a character area or a non-character area is determined incorrectly, quality of an inputted image with character sections and pattern sections coexisting herein can be improved by improving the resolution in the character sections and also improving the gradation in the pattern sections. In an image regenerating apparatus according to the present invention, as the specified magnification ratio is set to 170%, quality of an inputted image with character sections and pattern sections coexisting therein can be improved in improving the resolution of the character sections and also improving the gradation of the pattern sections.

In an image regenerating apparatus according to the present invention, whether a section is a pattern section or a character section is determined by detecting screen dots, and a magnification ratio is computed from the difference between pitches in the main scanning direction and auxiliary scanning direction of a screen image before the size thereof is changed by a size changing unit, so that determination of an area and computing of a size changing ratio can automatically and simultaneously be executed.

In an image regenerating apparatus according to the present invention, when an image is regenerated with the same size as that of the original image, an inputted image is delivered to an MTF correction filter in a first image processing unit as well as to a moire removing filter in a second image processing unit, and when a size of an image is enlarged in regeneration, an inputted image is delivered to either MTF correction filters in the first and second image processing unit or moire removing filters therein, and furthermore an output from the first image processing unit is selected in an area determined as a character area while an output from the second image processing unit is selected in an area determined as a non-character section.

For the reasons described above, even if a pattern area is emphasized when enlarged in regeneration, moire does not occur, so that the determination area is small and quality of inputted image with character sections and pattern sections coexisting therein can be improved by improving the resolution in the character sections and also improving the gradation in the pattern sections when a character section or a non-character section is determined incorrectly.

In an image regenerating apparatus according to the present invention, when an image is enlarged in regeneration, an output from an MTF correction filter is always selected irrespective of whether an area is a character area or a non-character area, and for this reason moire does not occur in a pattern area when enlarged in regeneration, so that the determination area is small and quality of inputted image with character sections and non-character sections coexisting therein by improving the resolution in the character sections and also improving the gradation in the pattern sections when a character section or a non-character section is determined incorrectly.

Other objects and features of this invention will become understood from the following description with reference to the accompanying drawings.

DESCRIPTION OF THE PREFERRED EMBODIMENTS

Figure 1:
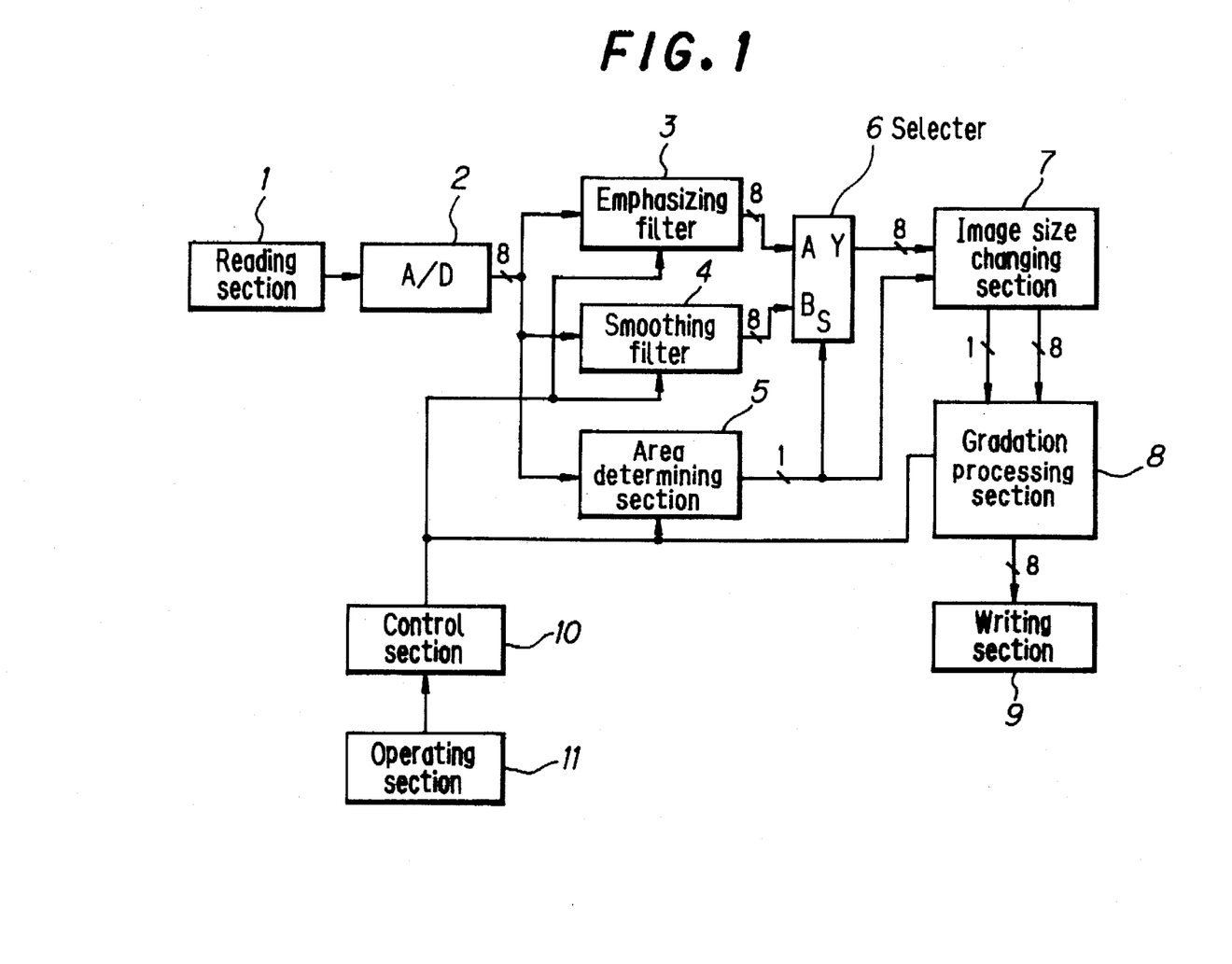
FIG. 1 is a block diagram showing general configuration of a system equipped with one embodiment of the image regenerating apparatus according to the present invention.
Figure 2:
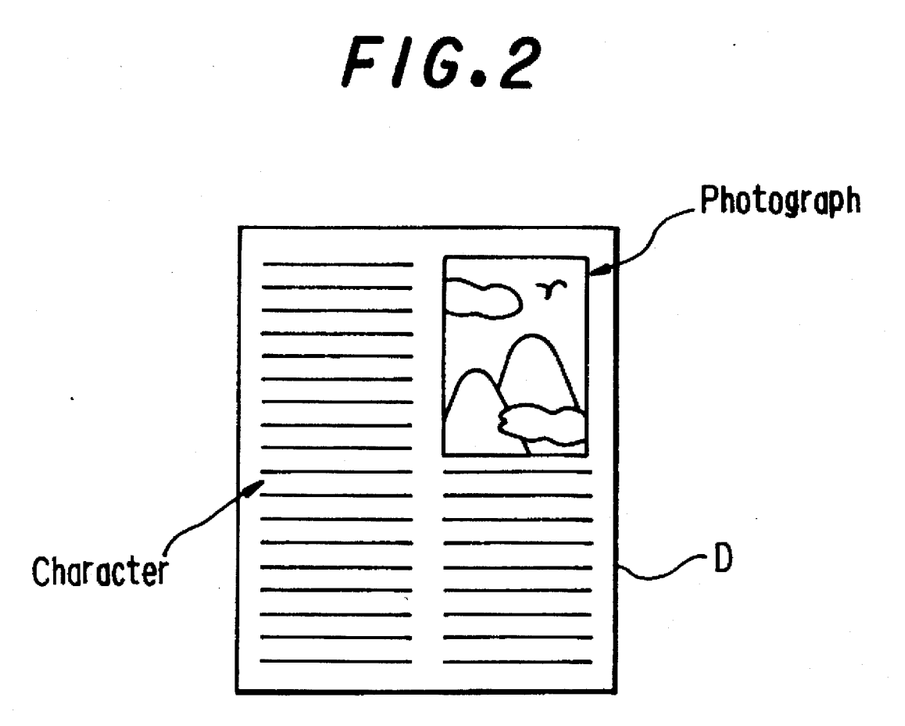
FIG. 2 is an explanatory view showing a document with character sections and pattern sections coexisting therein.
Figure 3:
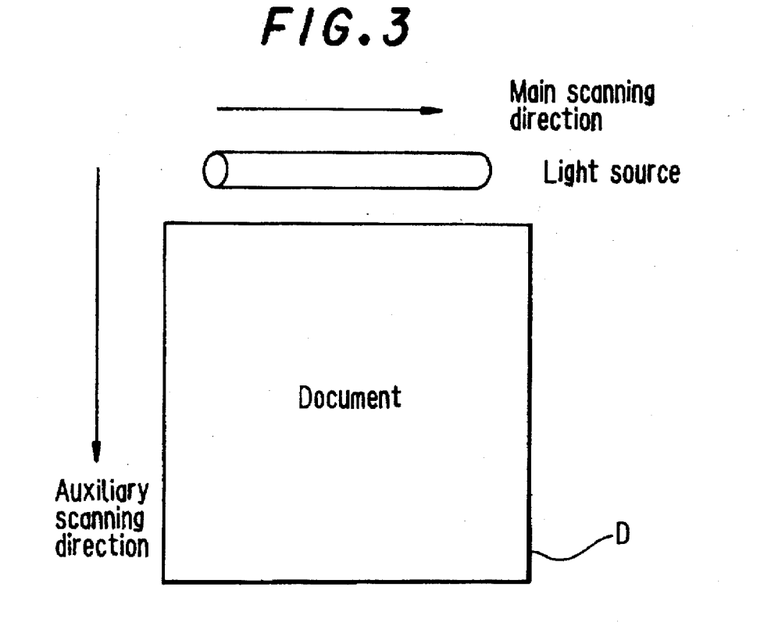
FIG. 3 is an explanatory view showing operations for scanning in the main scanning direction as well as in the auxiliary scanning direction of a document.
Figure 4:
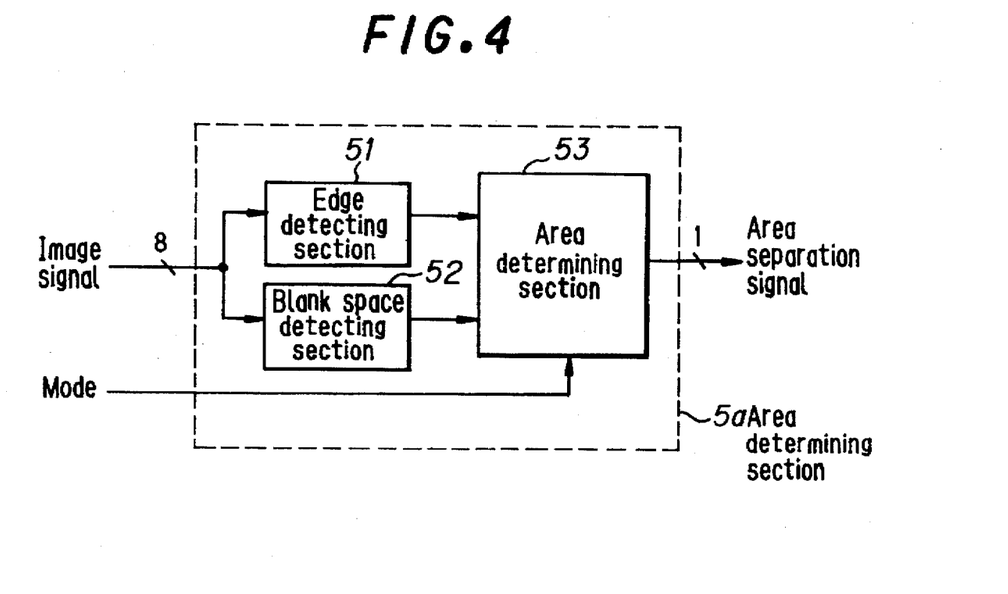
FIG. 4 is a block diagram showing an example of the area determining section shown in FIG. 1.
Figure 5:
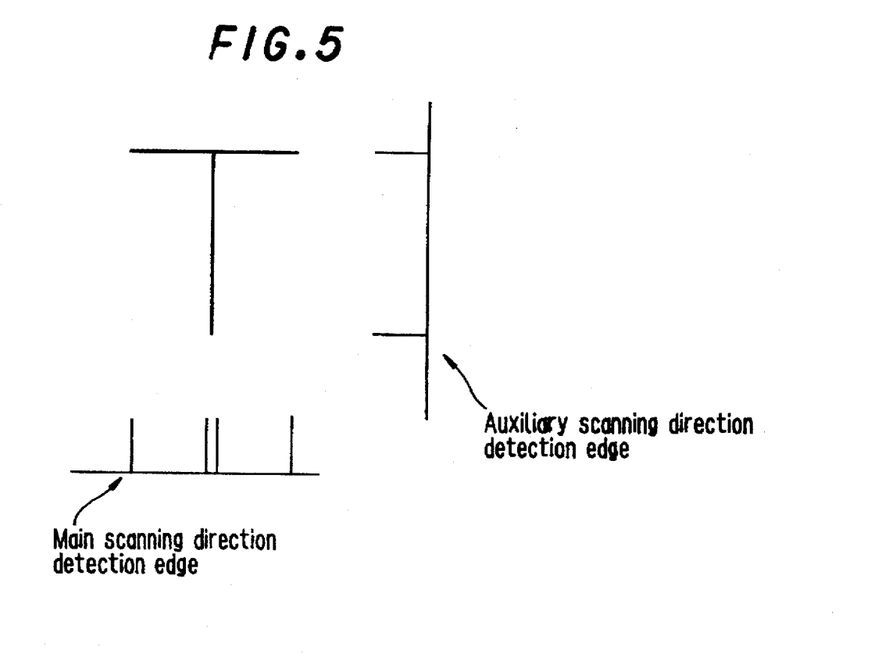
FIG. 5 is an explanatory view showing operations of the edge detecting section shown in FIG. 4.
Figure 6:
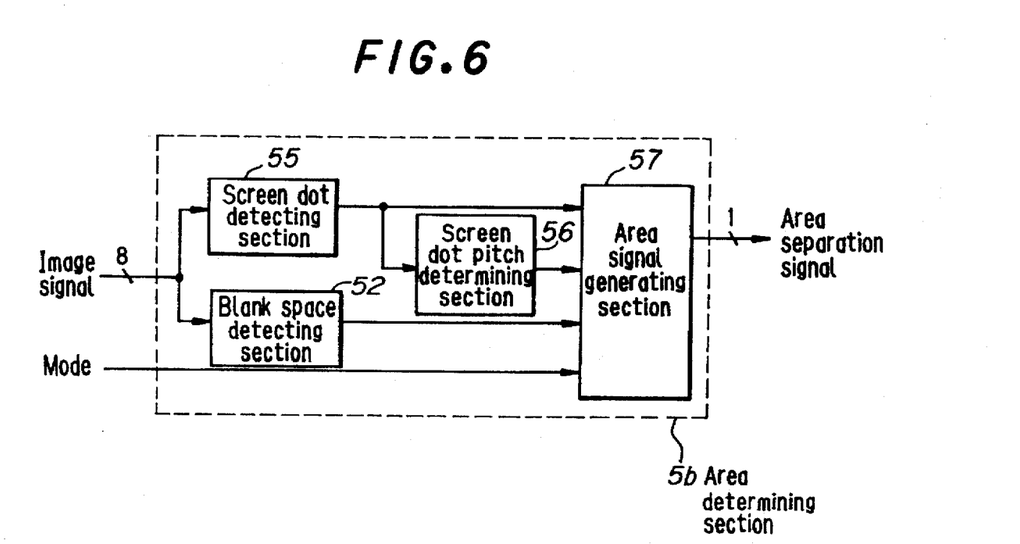
FIG. 6 is a block diagram showing another example of the area determining section shown in FIG. 1.
Figure 7:
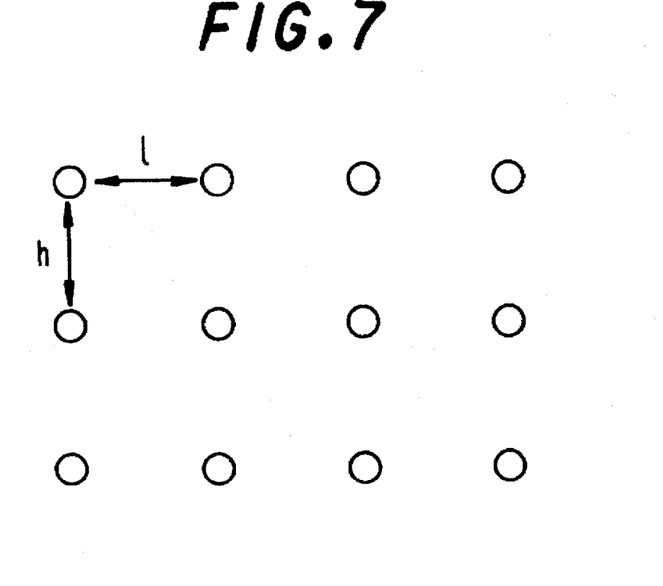
FIG. 7 is an explanatory view showing a pitch between screen dots when an image is read with the same size.
Figure 8:
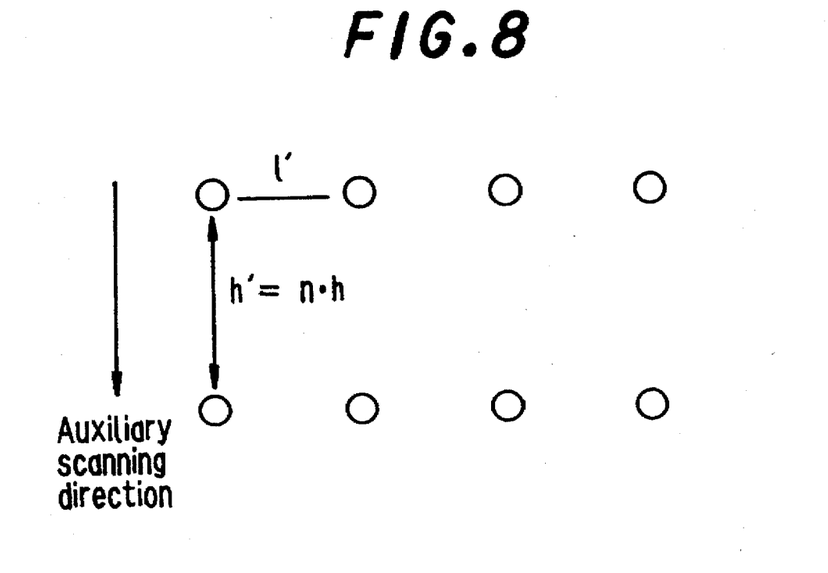
FIG. 8 is an explanatory view showing a pitch between screen dots when a size of an image is changed in reading.
Figure 9:
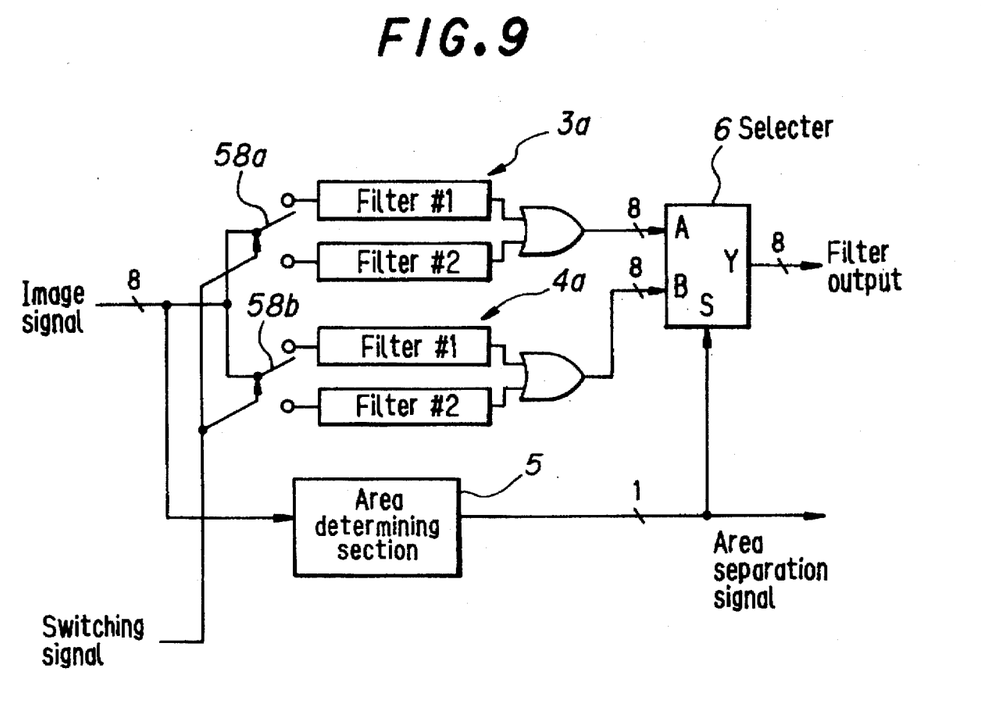
FIG. 9 is a block diagram showing an image regenerating apparatus according to a second embodiment of the present invention.
Figure 10:
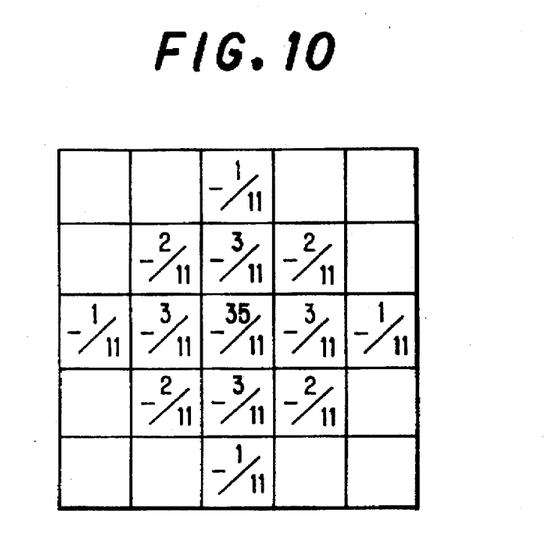
FIG. 10 is an explanatory view showing the MTF filter shown in FIG. 9.
Figure 11:
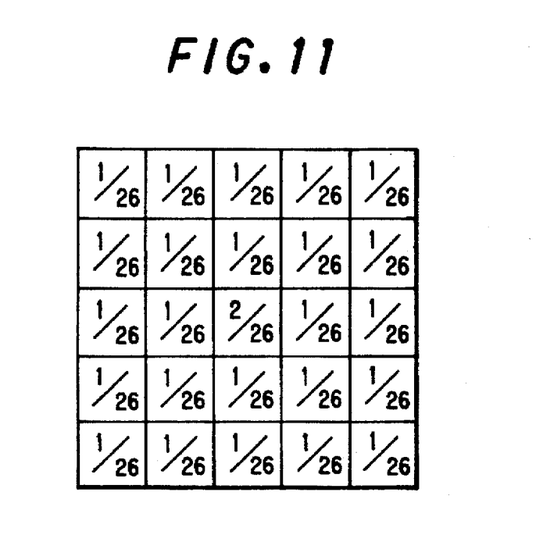
FIG. 11 is an explanatory view showing the moire removing filter shown in FIG. 10.
Figure 12:
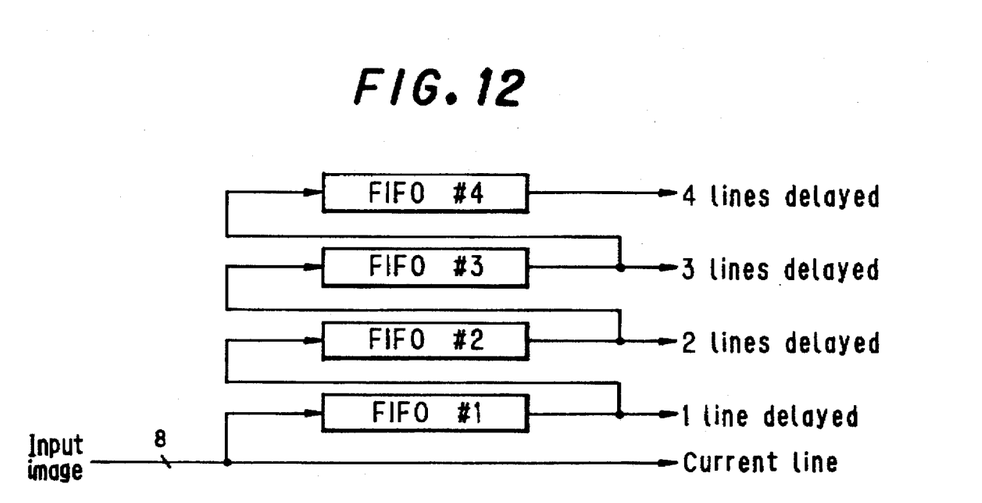
FIG. 12 is a block diagram showing a determination area extracting circuit in an area determining section.
Figure 13:
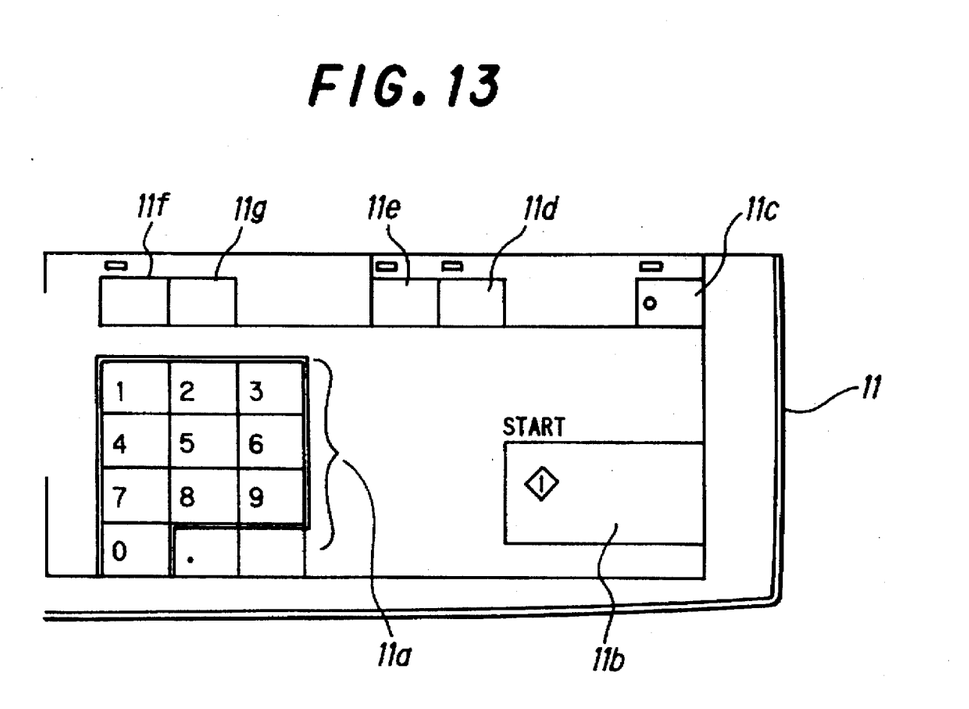
FIG. 13 is an explanatory view showing configuration of the operating section shown in FIG. 1.
Figure 14:
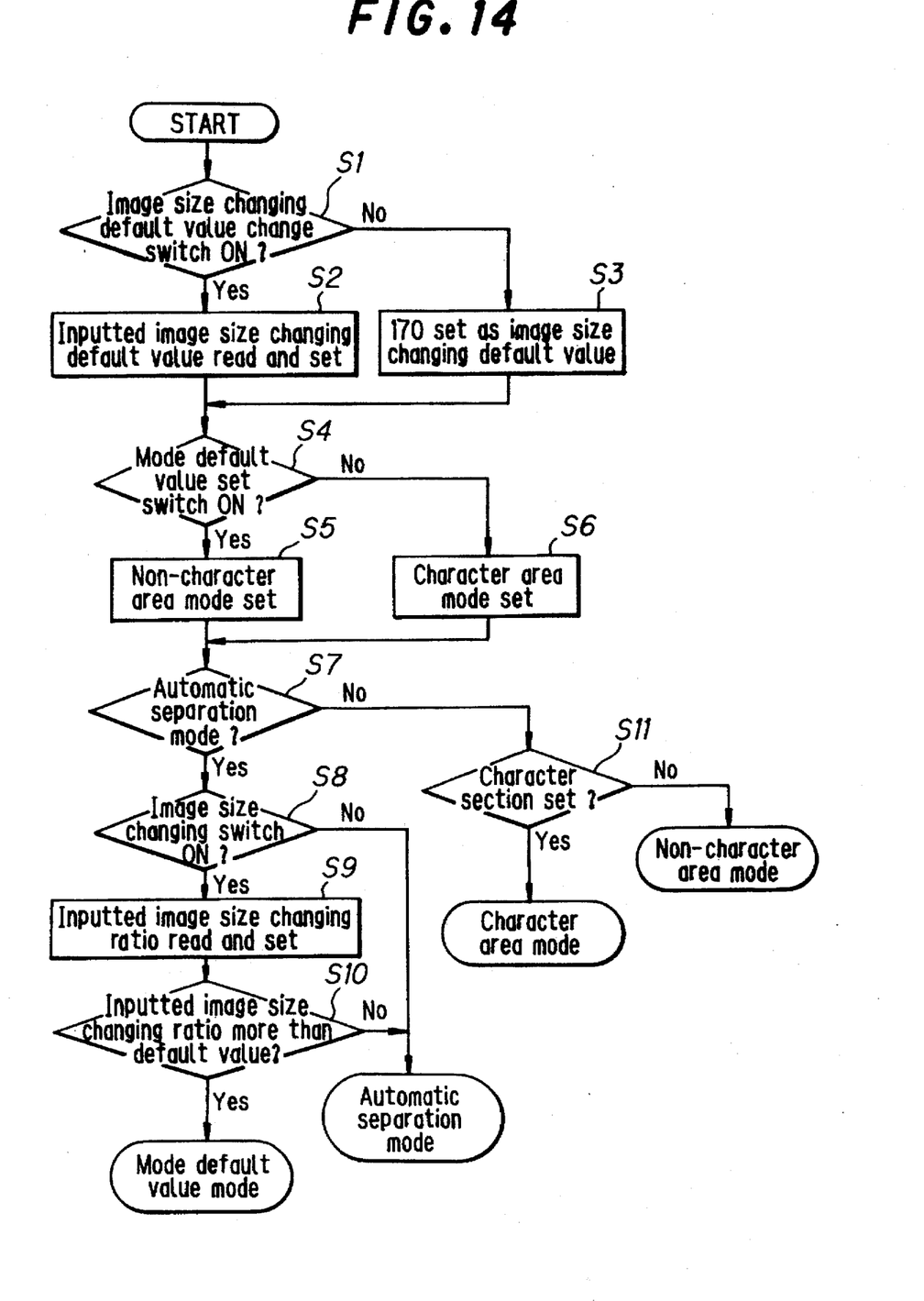
FIG. 14 is a flow chart showing processing operations in the control section shown in FIG. 1.

A detailed description is made for embodiments of the present invention with reference to the related drawings. FIG. 1 is a block diagram showing general configuration of a system equipped with one embodiment of an image regenerating apparatus according to the present invention; FIG. 2 is an explanatory view showing a document with character sections and pattern sections coexisting therein; FIG. 3 is an explanatory view showing scanning operations in the main and auxiliary scanning directions of the document; FIG. 4 is a block diagram showing an example of the area determining section shown in FIG. 1; FIG. 5 is an explanatory view showing operations of the edge detecting section shown in FIG. 4; FIG. 6 is a block diagram showing another example of the area determining section shown in FIG. 1; FIG. 7 is an explanatory view showing a pitch between screen dots when an image is read with the same size; FIG. 8 is an explanatory view showing a pitch between screen dots when a size of an image is changed in reading; FIG. 9 is a block diagram showing an image regenerating apparatus according to a second embodiment of the present invention; FIG. 10 is an explanatory view showing the MTF filter shown in FIG. 9; FIG. 11 is an explanatory view showing the moire removing filter shown in FIG. 10; FIG. 12 is a block diagram showing a determination area extracting circuit in an area determining section; FIG. 13 is an explanatory view showing configuration of the operating section shown in FIG. 1; and FIG. 14 is a flow chart showing processing operations in the control section shown in FIG. 1.

In FIG. 1, a reading section 1 optically reads a document D with character sections and pattern sections coexisting therein as shown, for instance, in FIG. 2, and converts read image data to discrete electric signals. The signals are converted by an A/D convertor 2 to, for instance, 8-bit digital data, and are loaded to an emphasizing filter 3, a smoothing filter 4, and an area determining section 5. The emphasizing filter 3 and smoothing filter 4 concurrently execute emphasizing processing and smoothing processing to an inputted image respectively, while the area determining section 5 determines character areas and non-character areas in the inputted image, and loads a 1-bit determination signal (for instance, L for a character area, and H for a non-character area) to a selector 6.

The selector 6 selects an output from the emphasizing filter 3 when a determination signal from the area determining section 5 is L, and selects an output from the smoothing filter 4 and outputs it to the image size changing section 7 when the determination signal is H. Data selected by the selector 6 is subjected to size changing by a image size changing section 7, then to gradation processing by a gradation processing section 8, and is recorded by a writing section 9 onto recording paper. A control section 10 controls the emphasizing filter 3, smoothing filter 4, and area determining section 5 according to an image quality mode and a magnification ratio set through an operating section 11 as described below.

Herein processing by the image size changing section 7 is performed electrically, and an image data inputted through light receiving elements for 1 line in the reading section 1 is subjected to size changing only in the main scanning direction. In contrast, size changing in the auxiliary scanning direction is executed by light receiving elements in the reading section 1 by means of mechanically changing a moving speed in the auxiliary scanning direction (Refer to FIG. 3).

Data subjected to size changing by the image size changing section 7, a determination signal from the area determining section 5, and an image quality mode setting signal from the control section 10 are loaded to the gradation processing section 8, where an image signal for writing is generated. For instance the resolution is important in a signal for a character area, so that 1-dot multiple-value processing is executed, and also in γ-conversion for writing a γ-conversion curve having an acute initial transition is used. On the other hand, as gradation is important in a pattern area belonging to a non-character area, processing giving smooth characteristics such as error diffusion processing is executed, and in γ-conversion in this case a γ-conversion curve having smooth initial transition is used.

Thus high quality image regeneration can be realized by means of appropriately executing filtering by the emphasizing filter 3 and smoothing filter 4 and gradation processing by the gradation processing section 8 for each determination area within an inputted image, but if area determination is not executed correctly, errors occur in the adaptation processing, which causes deterioration of image quality. Especially for correctly executing area determination when enlarging an image, a larger scale apparatus is required, which causes cost increase.

Next, a detailed description is made for the area determining section 5 with reference to FIG. 4 and other subsequent figures. Herein assuming that an image area required for area determination, when an image is regenerated with the same size as that of the original image, is, for instance, 5 lines in the auxiliary scanning direction, an FIFO memory for 4 lines is required, as shown in FIG. 12, to obtain a delayed image by means of real time processing. Also in order to correctly extract area data and appropriately execute determination processing when a document D with characters and photographs coexisting therein as shown in FIG. 2 is enlarged by 200%, image signals for 9 lines are required in the auxiliary scanning direction. For this reason, an FIFO memory for 10 lines is required, which means that a memory space for 5 lines is additionally required for an FIFO memory, and it causes cost increase. Similarly, when an image is enlarged by 400%, an FIFO memory for 19 lines is required.

On the other hand, as a pitch between dots each constituting a photograph or the like becomes wider when an image is enlarged, generation of moire is suppressed, and it rarely occurs when an image is enlarged by 200%. For this reason, although area determination is executed and an area separation signal is outputted by using a small number of FIFO memories, if a magnification ratio is equal to or higher than a specified value, this area separation signal is made invalid and a preset area separation signal is generated for suppressing cost increase as well as for preventing deterioration of quality of a regenerated image.

A result of the experiment conducted by the present applicant shows, although a slight difference occurs according to a pitch between screen dots in a document, when a magnification ratio is equal to or more than 170% which is a specified magnification ratio, quality of a regenerated image is not deteriorated even if area determination processing is not executed.

It should be noted that this specified magnification ratio can be changed and is previously set from the operating section 11.

FIG. 4 shows an example 5a of the area determining section 5 mainly executing area determination for a character section, and next description is made for an automatic separation mode in which an area is determined according to edge data detected, for instance as shown in FIG. 5, by an edge detecting section 51 and blank space data detected by a blank space detecting section 52. In case of the document D as shown in FIG. 2, black characters exist on white paper (blank space), and also an edge exists on a border between the blank space and the black characters. On the other hand, a blank space does not exist in a photograph area, and also a space of white texture does not exist, when viewed macroscopically, in a pattern section comprising screen dots. For this reason, the area determining section 53 determines an edge of a blank space as a character area, and outputs an area determination signal to the selector 6 so that an image signal from the emphasizing filter 3 is selected when a result of determination above indicates existence of a character area and an image signal from the smoothing filter 4 is selected when a result of the determination indicates existence of a non-character area.

Next, a description is made for a character area mode. In case of the character area mode, the area determining section 53 outputs an area determination signal to the selector 6 so that an image signal from the emphasizing filter 3 is selected irrespective of edge data from the edge detecting section 51 or blank space data from the blank space detecting section 52.

Next, a description is made for a non-character area mode. In case of the non-character area mode, the area determining section 53 outputs an area determination signal to the selector 6 so that an image signal from the smoothing filter 4 is selected irrespective of edge data from the edge detecting section 51 or blank space data from the blank space detecting section 52.

Next, a description is made for a mode default value mode. In case of the mode default value mode, the area determining section 53 outputs an area determination signal to the selector 6 so that an image signal from the emphasizing filter 3 or smoothing filter 4 is selected in a mode corresponding to a mode default value initially set irrespective of edge data from the edge detecting section 51 or blank space data from the blank space detecting section 52. It should be noted that, in the present embodiment, if the mode default value has not been changed, the character area mode is effected, and the area determining section 53 outputs an area determination signal to the selector 6 so that an image signal from the emphasizing filter 3 is selected.

FIG. 6 shows another example 5b of the area determining section 5 mainly executing area determination for a pattern area, and an area signal generating section 57 determines whether an area is a character area or a pattern area depending on blank space data detected by the blank space detecting section 52 and screen dot data detected by the screen dot detecting section 55. Herein, when the document D is viewed microscopically, dots each having the same radius are arrayed at a regular pitch in a blank space in a photograph area, so that the area signal generating section 57 can determine this area as a pattern area.

Furthermore, a screen dot pitch determining section 56 minutely determines screen dot pitches 1, h from the screen dot data as shown in FIG. 7 and estimates a magnification ratio from a relation between a pitch width 1 in the main scanning direction and a pitch width h in the auxiliary scanning direction. Herein image data used for area determination is data before subjected to size changing in the image size changing section 7, in which size change has been executed only in the auxiliary scanning direction under mechanical control by the reading section 1, when the image size is changed, the pitches 1', h' in the main and auxiliary scanning directions are different from the pitches 1, h as shown in FIG. 8.

It should be noted that FIG. 7 shows data when an image is read with the same size with that of the original image, and the pitch width 1 in the main scanning direction is almost the same as the pitch width h in the auxiliary scanning width. In contrast, FIG. 8 shows data read at a magnification ratio n, and the pitch width 1' in the main scanning direction is almost the same as the pitch width 1 when the image is read with the same size as that of the original image, but the pitch width h' in the auxiliary scanning direction is n times larger than the pitch width h when the image is read with the same size.

So the screen dot pitch determining section 56 estimates a magnification ratio from a difference between the pitch width 1 in the main scanning direction and the pitch width h in the auxiliary scanning direction, and when the estimated magnification ratio is equal to or larger than a specified value, and area signal generating section 57 masks an area signal and decides the entire area as a character area or a pattern area. Also in this case, moire rarely occurs in most cases even if the photograph section is emphasized, so that character processing is executed to the entire area, and also an area determination signal is ignored by the area signal generating section 57 according to a processing mode separately inputted from the operating section 11, and for instance when a mode for executing character processing to an area as a whole is specified, an area signal is always outputted as a character area signal.

Next, a description is made for control processing by the operating section as well as by the control section 10 with reference to FIG. 13 and FIG. 14. FIG. 13 is an explanatory view showing concrete configuration of the operating section 11, and provided in the control section 11 are a tenkey 11a for entering numerical data, a start key 11b for starting copying operation, a size changing switch 11c for starting image size changing operation, a mode default value set switch 11d for setting a mode default value, a character area select key 11e for selecting a character area, an image size changing ratio default changing switch 11f for changing a default value of image size changing ratio, an automatic separation key 11g for setting a separation mode and others. It should be noted that numerical data inputted with the tenkey 11a includes, in addition to a number of sheets of copy, for instance, an image size changing ratio default value, and an image size changing ratio.

FIG. 14 is a flow chart showing control operations by the control section 10, and at first determination is made as to whether the image size changing ratio default value changing switch 11f is ON or not (S1). As a result of the determination, if it is determined that the image size changing ratio default value changing switch 11f is ON, an inputted image size changing ratio default value is read and set (S2). On the contrary, if it is determined that the image size changing default value changing switch 11f is OFF, "170" is set as an image size ratio default value. Then determination is made as to whether the mode default value set switch 11d is ON or not (S4). As a result of the determination, if it is determined that the mode default value set switch 11d is ON, a non-character area mode is set (S5). On the contrary, if it is determined that the mode default value set switch 11d is OFF, a character area mode is set (S6). Then, determination is made as to whether the current mode is a separation mode or not (S7), and if it is determined that the current mode is a separation mode, then determination is made as to whether the image size changing switch 11c is ON or not (S8). As a result, if it is determined that the image size changing switch 11c is ON, the inputted image size changing ratio is read and set (S9). On the contrary, if it is determined that the image size changing switch 11c is OFF, an automatic separation mode is effected. After the processing in step S9 is executed, determination is made as to whether the image size changing ratio is equal to or larger than the image size changing ration default value or not (S10), and if it is determined that the image size changing ratio is equal to or larger than the default value, and a mode default value mode is effected. On the contrary, if it is determined that the image size changing ratio is less than the image size changing ratio default value, the automatic separation mode is effected. Furthermore, in step S7, if it is determined that the current mode is not the automatic separation mode, then determination is made as to whether a character area selection has been executed by operating the character area select key 11e or not (S11), and if it is determined that the character area selection has been executed, the character area mode is effected, and on the contrary if it is determined that the character area selection has not been executed, the non-character area mode is effected.

It should be noted that, although the control section 10 usually starts operations of the entire system after each mode is decided when the START key 11b is turned ON and continues the same mode until a series of operations is complete, if an instruction concerning an area or the like is given during processing of 1-page document image or during processing of one page in a series of document images and mode change including image size changing is started, operations for control processing shown in FIG. 14 above are started again.

FIG. 9 shows an image regenerating apparatus according to a second embodiment of the present invention, and in this case masking of an area signal is not executed, filters each having the same coefficient are provided in the emphasizing section 3a and smoothing section 4a so that processing can homogeneously be executed to an entire image. Namely, both the emphasizing section 3a and smoothing section 4a have an MTF correction filter #1 having a coefficient for correction of MTF deterioration in a reading system as shown in FIG. 10 and a moire removal filter #2 having a coefficient for removal of moire as shown in FIG. 11, respectively.

In this second embodiment, when an image is regenerated with the same size as that of the original image, the MTF correction filter #1 is selected for use in the emphasizing section 3a and also the moire removal filter #2 is selected for use in the smoothing section 4a, said selection being executed by the switching sections 58a, 58b respectively, so that appropriate processing can be executed to the document D with character sections and pattern sections coexisting therein.

On the other hand, when an image is enlarged in regeneration, both in the emphasizing section 3a and smoothing section 4a, for instance the MTF correction filter #1 is selected depending on a filter switch signal by the switching sections 58a, 58b, and character processing is executed to the entire area. It should be noted that the filter switching signal may be a mode signal or a magnification ratio inputted through the operating section 11, or may be a control signal estimated from difference between the pitch width 1 between screen dots in the main scanning direction and pitch width h between screen dots in the auxiliary scanning direction, as shown in FIG. 6 to FIG. 8.

It should be noted that the MTF correction filter #1 and the moire removing filter #2 may not always be of the same type, a plurality type of filters each having a different coefficient may be provided, and filters each having a coefficient suited to contents of processing may selectively be used. Also the filter size is not always limited to 5×5 as shown in FIG. 10 and FIG. 11, and filters having a different size may be used. It should be noted that, although detailed descriptions are not provided for an image size changing system in the image size changing section 7 shown in FIG. 1, any system may be used provided that an image signal and an area signal are synchronized for image size changing. Also, other gradation processing system other than 1-dot processing and error diffusion described above may be used for character area processing and non-character area processing in the gradation processing section 8, and also various types of processing may be combined according to the necessity.

As described above, in the image regenerating apparatus according to the present invention, if an image size changing ratio set by the image size changing unit is equal to or higher than a specified magnification ratio, control is provided so that the area determinator executes specified selection, and for this reason moire in a pattern area does not occur when an image is enlarged in regeneration, the determination area is small, quality of an image with character areas and non-character areas coexisting therein can be improved, when a character area or a non-character area is determined incorrectly, by improving the resolution of the character sections and also improving the gradation of the pattern areas, so that cost reduction of a product can be realized without deteriorating quality of regenerated images.

In the image regenerating apparatus according to the present invention, when an image size changing ratio set by the image size changing unit is equal to or larger than a specified magnification ratio, control is provided so that coefficients for filtering by the emphasizing unit and smoothing unit are equalized, and for this reason moire does not occur in a pattern area when an image is enlarged in regeneration, the determination area is small, quality of an image with character sections and pattern sections coexisting therein can be improved, when a character area or a non-character area is determined incorrectly, by improving the resolution in the character sections and also improving the gradation in the pattern sections, so that cost reduction of a product can be realized without deteriorating quality of regenerated images.

In the image regenerating apparatus according to the present invention, as a specified magnification ratio is set to 170%, quality of an inputted image with character sections and pattern sections coexisting therein can be improved by improving the resolution of the character sections and also improving the gradation of the pattern sections, so that cost reduction of a product can be realized without deteriorating quality of regenerated images.

In the image regenerating apparatus according to the present invention, determination as to whether an area is a pattern section or a character section is executed by detecting screen dots, and also an image size changing ratio is computed from a difference between a screen dot pitch in the main scanning direction and that in the auxiliary scanning direction of a screen dot image before the image is changed by the image size changing unit, so that determination of an area and computing of an image size changing ratio can be executed concurrently.

In the image regenerating apparatus according to the present invention, when an image is regenerated with the same size as that of the original image, an inputted image is delivered to an MTF correction filter in the first image processing unit as well as to a moire removing filter in the second image processing unit, and when an image is enlarged in regeneration, an inputted image is delivered to an MTF correction filter or a moire removing filter in both the first image processing mean and the second image processing unit, and also an output from the first image processing unit is selected for an area determined as a character area, while an output from the second image processing unit is selected for an area determined as a non-character area, and for this reason moire in a pattern area does not occur when an image is enlarged in regeneration, and the determination area is small, so that, when a character area or a non-character area is determined incorrectly, quality of an inputted image with character sections and pattern sections coexisting therein can be improved by improving the resolution of character sections and also improving the gradation of pattern sections.

In the image regenerating apparatus according to the present invention, when an image is enlarged in regeneration, an output from the MTF correction filter is always selected irrespective of whether an area is a character area or a non-character area, and for this reason moire does not occur even a pattern area is subjected to processing for emphasis, and the determination area is small, so that quality of an inputted image with character areas and non-character areas coexisting therein can be improved, when a character area or a non-character area is determined incorrectly, by improving the resolution of the character sections and also improving the gradation of pattern sections.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image regenerating apparatus comprising:
   an emphasizing unit for filtering an image for emphasis;
   a smoothing unit for filtering an image for smoothing;
   an area determinator for determining a character area and a photograph area in an image and selecting said emphasizing unit for said character area or said smoothing unit for said photograph area;
   an image size changing unit for changing size of an image according to a set image size changing ratio; and
   a controller for providing control so that said area determinator executes specified selection when an image size changing ratio set by said image size changing unit is equal to or larger than a specified magnification ratio.

2. An image regenerating apparatus according to claim 1, wherein said specified magnification ratio is 170%.

3. An image regeneration apparatus according to claim 1, comprising:
   a document reader in which an image size changing ratio in the auxiliary scanning direction of a document image can be changed when reading a document; and
   wherein said image size changing unit is configured such that an image size changing ratio can be changed in the main scanning direction of an image;
   wherein said area determinator determines whether an area is a pattern section or a character section by detecting screen dots and said image size changing unit computes an image size changing ratio from difference between screen dot pitches in the main scanning direction and auxiliary scanning direction of a screen dot image before the size is changed by said image size changing unit.

4. An image regenerating apparatus comprising:
   emphasizing unit for filtering an image for emphasis;
   a smoothing unit for filtering an image for smoothing;
   an area determinator for determining a character area and a photograph area in an image and selecting said emphasizing unit for said character area or said smoothing unit for said photograph area;
   an image size changing unit for changing size of an image according to a set image size changing ratio; and
   a controller for providing controls so that coefficients for filtering by said emphasizing unit and said smoothing unit are equalized when an image size changing ratio set by said image size changing unit is equal to or larger than a specified magnification ratio.

5. An image regenerating apparatus according to claim 4, wherein said specified magnification ratio is 170%.

6. An image regeneration apparatus according to claim 4, comprising:
   a document reader in which an image size changing ratio in the auxiliary scanning direction of a document image can be changed when reading a document; and
   wherein said image size changing unit is configured such that an image size changing ratio can be changed in the main scanning direction of an image;
   wherein said area determinator determines whether an area is a pattern section or a character section by detecting screen dots and said image size changing unit computes an image size changing ratio from difference between screen dot pitches in the main scanning direction and auxiliary scanning direction of a screen dot image before the size is changed by said image size changing unit.

7. An image regenerating apparatus comprising:
   a first and a second image processing unit each having both an MTF correction filter for MTF correction of an image and a moire removing filter for removing moire of an image;
   a switching unit for delivering an inputted image, when an image is regenerated with the same size or a compressed size, to an MTF correction filter in said first image processing unit and also to a moire removing filter in said second image processing unit, and, when an image is regenerated with an enlarged size, to either an MTF correction filter or moire removing filter in both said first and second unit;
   a selecting unit for selecting an output from said first or second image processing unit; and
   an area determinator for determining a character area and a non-character area in an image, selecting an output from said first image processing unit for an area determined as a character area, and also selecting an output from said second image processing unit for an area determined as a non-character area.

8. An image regenerating apparatus according to claim 7, wherein said switching unit always delivers an inputted image to an MTF correction filter in said first image processing unit, when an image is regenerated with an enlarged size.

* * * * *